(12) United States Patent
Bian et al.

(10) Patent No.: US 12,353,004 B2
(45) Date of Patent: Jul. 8, 2025

(54) WAVEGUIDE ESCALATORS FOR A PHOTONICS CHIP

(71) Applicant: GlobalFoundries U.S. Inc., Malta, NY (US)

(72) Inventors: Yusheng Bian, Ballston Lake, NY (US); Kevin Dezfulian, Arlington, VA (US); Kenneth Giewont, Hopewell Junction, NY (US); Karen Nummy, Newburgh, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 327 days.

(21) Appl. No.: 18/115,046

(22) Filed: Feb. 28, 2023

(65) Prior Publication Data
US 2024/0288631 A1    Aug. 29, 2024

(51) Int. Cl.
*G02B 6/12*         (2006.01)
*G02B 6/136*        (2006.01)

(52) U.S. Cl.
CPC ..... *G02B 6/12004* (2013.01); *G02B 6/12002* (2013.01); *G02B 2006/12061* (2013.01); *G02B 6/136* (2013.01)

(58) Field of Classification Search
CPC ....... G02B 6/12002; G02B 6/30; G02B 6/305
See application file for complete search history.

(56) References Cited

U.S. PATENT DOCUMENTS

| | | | |
|---|---|---|---|
| 6,819,853 B2 | 11/2004 | Lam et al. | |
| 10,429,582 B1 | 10/2019 | Bian et al. | |
| 10,649,140 B1 | 5/2020 | Bian et al. | |
| 10,677,991 B2 | 6/2020 | Novack et al. | |
| 10,775,560 B1 * | 9/2020 | Fujita | G01N 21/552 |
| 11,378,743 B1 * | 7/2022 | Bian | G02B 6/305 |
| 11,493,686 B2 * | 11/2022 | Bian | G02B 6/122 |
| 2011/0182549 A1 * | 7/2011 | Okayama | G02B 6/305 |
| | | | 385/43 |

(Continued)

OTHER PUBLICATIONS

Kuanping Shang, Shibnath Pathak, Binbin Guan, Guangyao Liu, and S. J. B. Yoo, "Low-loss compact multilayer silicon nitride platform for 3D photonic integrated circuits," Optics Express 23, 21334-21342 (2015).

(Continued)

*Primary Examiner* — Charlie Y Peng
(74) *Attorney, Agent, or Firm* — Thompson Hine LLP; Anthony Canale (57) ABSTRACT

Structures for a waveguide escalator and methods of forming such structures. A structure comprises a first waveguide core, and a back-end-of-line stack including a first dielectric layer, a second dielectric layer on the first dielectric layer, an opening in the second dielectric layer, a second waveguide core including a section that overlaps with a section of the first waveguide core, and a plurality of third waveguide cores disposed between the section of the first waveguide core and the section of the second waveguide core. The plurality of third waveguide cores are positioned inside the opening in the second dielectric layer, the first dielectric layer comprises a first material with a first refractive index, and the second dielectric layer comprises a second material with a second refractive index different from the first refractive index.

20 Claims, 12 Drawing Sheets

(56) References Cited

U.S. PATENT DOCUMENTS

2016/0327742 A1 11/2016 Collins et al.
2022/0260775 A1* 8/2022 Bruck .................. G02B 6/132

OTHER PUBLICATIONS

W. D. Sacher et al., "Monolithically Integrated Multilayer Silicon Nitride-on-Silicon Waveguide Platforms for 3-D Photonic Circuits and Devices," in Proceedings of the IEEE, vol. 106, No. 12, pp. 2232-2245, Dec. 2018, doi: 10.1109/JPROC.2018.2860994.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al, "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3I.4.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

Y. Bian et al., "3D silicon photonic interconnects and integrated circuits based on phase matching," 2021 IEEE 71st Electronic Components and Technology Conference (ECTC), 2021, pp. 2279-2284, doi: 10.1109/ECTC32696.2021.00357.

Y. Bian et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optica Publishing Group, 2020), paper FTu6E.3.

A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper W6A.1.

Bian, Yusheng, "Edge Couplers Including a Metamaterial Layer" filed on Mar. 23, 2022 as a U.S. Appl. No. 17/701,942.

Bian, Yusheng, "Photonic Integrated Circuit Structure With Coupler for Interlayer Waveguide Coupling" filed on Mar. 31, 2022 as a U.S. Appl. No. 17/709,841.

Bian, Yusheng, "Photonic Integrated Circuit Structure With Coupler for Interlayer Waveguide Coupling" filed on Apr. 19, 2022 as a U.S. Appl. No. 17/723,608.

European Patent Office, Extended European Search Report and Opinion issued in European Patent Application No. 23192904.3 on Jan. 31, 2024; 11 pages.

* cited by examiner

WAVEGUIDE ESCALATORS FOR A PHOTONICS CHIP

BACKGROUND

The disclosure relates to photonics chips and, more specifically, to structures for a waveguide escalator and methods of forming such structures.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

A waveguide crossing array may include waveguide cores that are arranged in multiple levels on a photonics chip. For example, a waveguide crossing array may include waveguide cores in a lower level, waveguide cores in an upper level that are routed over and across the waveguide cores in the lower level, and waveguide escalators that transfer light between the waveguide cores in the lower level and the waveguide cores in the upper level. Direct crossings of waveguide cores may result in adverse consequences, such as significant insertion loss and substrate leakage, due to strong light scattering induced by the close local proximity of the waveguide cores in the upper and lower levels. Conventional waveguide crossing arrays are unable to avoid the occurrence of these negative consequences.

Improved structures for a waveguide escalator and methods of forming such structures are needed.

SUMMARY

In an embodiment of the invention, a structure comprises a first waveguide core, and a back-end-of-line stack including a first dielectric layer, a second dielectric layer on the first dielectric layer, an opening in the second dielectric layer, a second waveguide core including a section that overlaps with a section of the first waveguide core, and a plurality of third waveguide cores disposed between the section of the first waveguide core and the section of the second waveguide core. The plurality of third waveguide cores are positioned inside the opening in the second dielectric layer, the first dielectric layer comprises a first material with a first refractive index, and the second dielectric layer comprises a second material with a second refractive index different from the first refractive index.

In an embodiment of the invention, a method comprises forming a first waveguide core, and forming a back-end-of-line stack that includes a first dielectric layer, a second dielectric layer on the first dielectric layer, an opening in the second dielectric layer, a second waveguide core including a section that overlaps with a section of the first waveguide core, and a plurality of third waveguide cores disposed between the section of the first waveguide core and the section of the second waveguide core. The plurality of third waveguide cores are positioned inside the opening in the second dielectric layer, the first dielectric layer comprises a first material with a first refractive index, and the second dielectric layer comprises a second material with a second refractive index different from the first refractive index.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
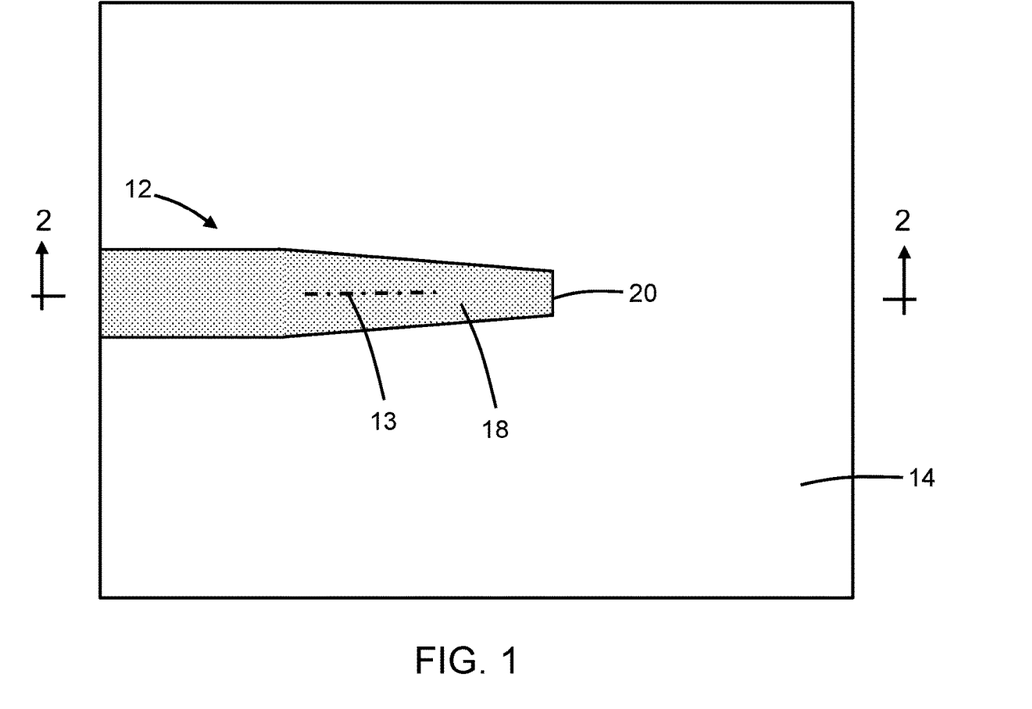
FIG. 1 is a top view of a structure at an initial fabrication stage of a processing method in accordance with embodiments of the invention.
Figure 2:
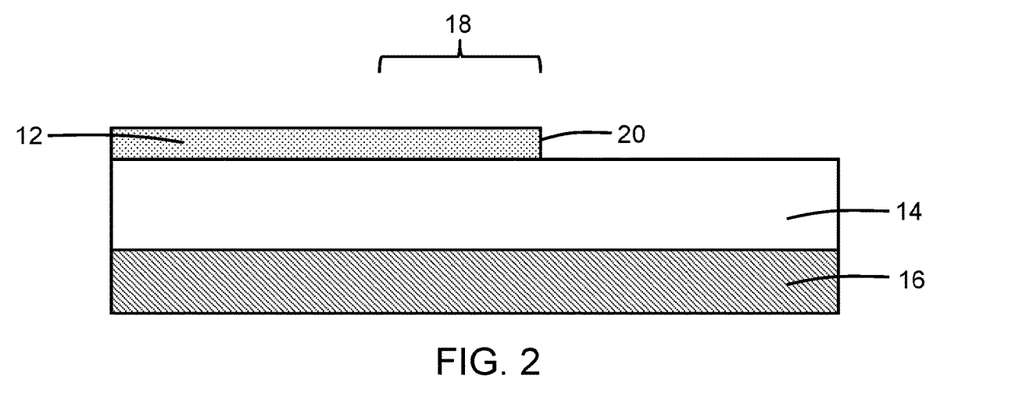
FIG. 2 is a cross-sectional view taken generally along line 2-2 in FIG. 1.

With reference to FIGS. 1, 2 and in accordance with embodiments of the invention, a structure 10 for a waveguide escalator includes a waveguide core 12 that is positioned on, and over, a dielectric layer 14 and a semiconductor substrate 16. In an embodiment, the dielectric layer 14 may be comprised of a dielectric material, such as silicon dioxide, and the semiconductor substrate 16 may be comprised of a semiconductor material, such as single-crystal silicon. In an embodiment, the dielectric layer 14 may be a buried oxide layer of a silicon-on-insulator substrate, and the dielectric layer 14 may be disposed between the waveguide core 12 and the semiconductor substrate 16. The dielectric layer 14 may function as an underlying cladding layer for the waveguide core 12. In an alternative embodiment, one or more additional dielectric layers comprised of a dielectric material, such as silicon dioxide, may be positioned between the dielectric layer 14 and the waveguide core 12.

The waveguide core 12 may include a section 18 and an end 20 that terminates the section 18. The waveguide core 12 may be lengthwise aligned along a longitudinal axis 13. The waveguide core 12 may be connected to other optical components on the photonics chip. The waveguide core 12 may have a width dimension, and the width dimension may vary over the length of the section 18. In an embodiment, the section 18 may be tapered, and the width dimension of the section 18 may increase with increasing distance from the end 20. In an embodiment, the width dimension of the section 18 may linearly increase with increasing distance from the end 20. In an alternative embodiment, the width dimension of the section 18 may change based on a non-linear function, such as a quadratic function, a cubic function, a parabolic function, a sine function, a cosine function, a Bezier function, or an exponential function. In an embodiment, the section 18 may have a uniform taper angle as a result of the increasing width dimension. In an alternative embodiment, the section 18 may taper in multiple stages each having a different taper angle.

In an embodiment, the waveguide core 12 may be comprised of a material having a refractive index that is greater than the refractive index of silicon dioxide. In an embodiment, the waveguide core 12 may be comprised of a dielectric material, such as silicon nitride. In an alternative embodiment, the waveguide core 12 may be comprised of silicon oxynitride, aluminum nitride, or aluminum oxide. In an alternative embodiment, the waveguide core 12 may be comprised of a semiconductor material, such as single-crystal silicon. In alternative embodiments, other materials, such as a polymer or a III-V compound semiconductor, may be used to form the waveguide core 12.

In an embodiment, the waveguide core 12 may be formed by patterning a layer of its constituent material with lithography and etching processes. In an alternative embodiment, a slab layer may be connected to a lower portion of the waveguide core 12. The slab layer may be formed when the waveguide core 12 is patterned, and the slab layer, which is positioned on the dielectric layer 14, may have a thickness that is less than the thickness of the waveguide core 12.

Figure 3:
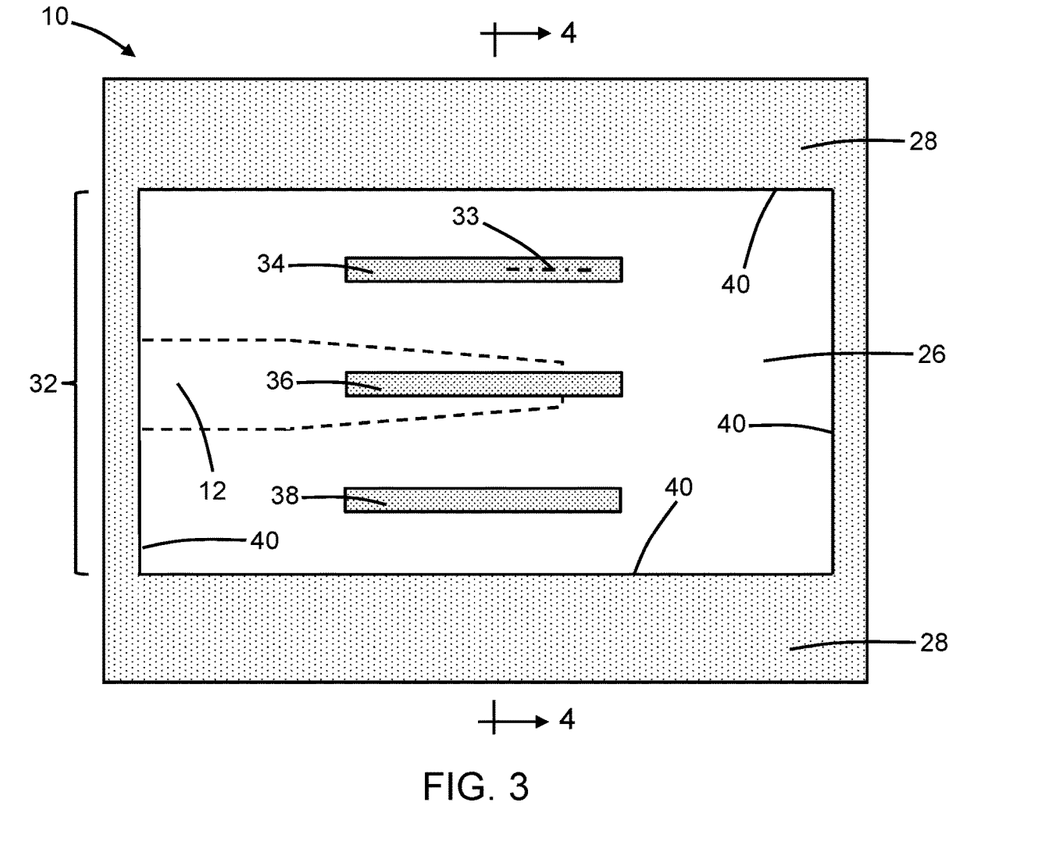
FIG. 3 is a top view of the structure at a fabrication stage of the processing method subsequent to FIG. 1.
Figure 4:
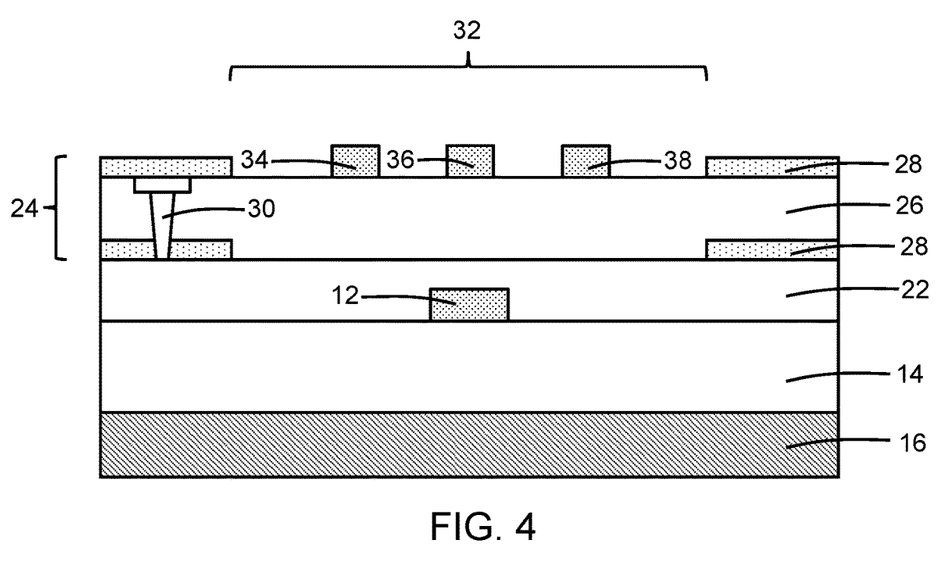
FIG. 4 is a cross-sectional view taken generally along line 4-4 in FIG. 3.

With reference to FIGS. 3, 4 in which like reference numerals refer to like features in FIGS. 1, 2 and at a subsequent fabrication stage, a dielectric layer 22 may be formed over the waveguide core 12. The dielectric layer 22 may be comprised of a dielectric material, such as silicon dioxide, having a lower refractive index than the dielectric material constituting the waveguide core 12. The waveguide core 12 is embedded in the dielectric layer 22, which may be deposited and planarized following deposition, and the dielectric layer 22 may be thicker than the height of the waveguide core 12.

A back-end-of-line stack 24 may be formed over the waveguide core 12 and dielectric layer 22. The back-end-of-line stack 24 may include dielectric layers 26 and dielectric layers 28 of different composition that alternate with the dielectric layers 26. The dielectric layers 26 may be comprised of a dielectric material, such as silicon dioxide, tetraethylorthosilicate silicon dioxide, or fluorinated-tetraethylorthosilicate silicon dioxide, that is an electrical insulator. The dielectric layers 28 may be comprised of a dielectric material, such as nitrogen-doped silicon carbide or nitrogen-doped hydrogenated silicon carbide, that is an electrical insulator. In an embodiment, the dielectric material of the dielectric layers 28 may have a refractive index that is different from the refractive index of the dielectric material of the dielectric layers 26. In an embodiment, the dielectric material of the dielectric layers 28 may have a refractive index that is greater than the refractive index of the dielectric material of the dielectric layers 26. In an embodiment, the dielectric layers 26 may be comprised of a dielectric material that lacks carbon, and the dielectric layers 28 may be comprised of a dielectric material that includes carbon.

Each adjacent pair of the dielectric layers 26, 28 may define a metallization level of the back-end-of-line stack 24. Metal features 30 may be formed in the dielectric layers 26, 28 of each metallization level, and the metal features 30 in the metallization levels may define vertical interconnections that extend through the dielectric layers 26, 28 of the back-end-of-line stack 24. The metal features 30 may be comprised of a metal, such as copper, and the metal features 30 in each metallization level may include lines and vias that are formed in the dielectric layers 26, 28 by a damascene process. The metal features 30 may be laterally offset from the waveguide core 12.

The dielectric layers 28 may be patterned by lithography and etching processes in each metallization level of the back-end-of-line stack 24 such that a portion of each dielectric layer 28 is removed to define an opening 32. The openings 32 in the dielectric layers 28 may be arranged with an alignment to overlap with the section 18 of the waveguide core 12. The opening 32 defined by the removed portion of each dielectric layer 28 may penetrate through the full thickness of the dielectric layer 28. The non-removed portion of each dielectric layer 28 terminates at edges 40 arranged about the perimeter of the associated opening 32, and the edges 40 may surround the perimeter of each opening 32. In an embodiment, the perimeter defined by the edges 40 of each opening 32 may be rectangular. Each dielectric layer 26 may be disposed between a pair of the dielectric layers 28 that include the openings 32. In an embodiment, the dielectric layers 28 may be thinner than the dielectric layers 26.

The structure 10 may further include waveguide cores 34, 36, 38 that are positioned in an array over the topmost dielectric layer 26 and in a different elevation or level within the structure 10 than the waveguide core 12. The waveguide core 12 is arranged in a vertical direction between the waveguide cores 34, 36, 38 and the semiconductor substrate 16. The waveguide cores 34, 36, 38 have a laterally-spaced juxtaposed arrangement on the dielectric layer 26 with the waveguide core 36 disposed in a lateral direction between the waveguide core 34 and the waveguide core 38. Each of the waveguide cores 34, 36, 38 may be an elongated strip aligned along a longitudinal axis 31 and may be truncated at opposite ends. In an embodiment, the longitudinal axes 31 of the waveguide cores 34, 36, 38 may be aligned parallel or substantially parallel to the longitudinal axis 13 of the waveguide core 12. In an embodiment, the waveguide cores 34, 36, 38 may have approximately equal lengths and widths, and the waveguide cores 34, 36, 38 may be disposed in the laterally-spaced juxtaposed arrangement without any longitudinal offsets. In an embodiment, the waveguide core 36 may be positioned to overlap with all or a portion of the section 18 of the waveguide core 12, and the waveguide core 34 and the waveguide core 38 may be positioned to have a non-overlapping relationship with the section 18 of the waveguide core 12.

The waveguide cores 34, 36, 38 are disposed inside the opening 32 in the dielectric layer 28 of the associated metallization level of the back-end-of-line stack 24. In an embodiment, the waveguide cores 34, 36, 38 may be fully disposed inside the associated opening 32 in the dielectric layer 28 such that a margin of the dielectric material of the subsequently-deposited dielectric layer 26 separates the waveguide cores 34, 36, 38 from the edges 40 of the opening 32. The openings 32 in the different dielectric layers 28 may be aligned such that the dielectric material of dielectric layers 28 is not disposed in a vertical direction between the waveguide cores 34, 36, 38 and the waveguide core 12.

The waveguide cores 34, 36, 38 may be comprised of a dielectric material having a refractive index greater than the refractive index of silicon dioxide. The waveguide cores 34, 36, 38 may be comprised of a dielectric material having a refractive index greater than the refractive index of the dielectric material of the dielectric layers 26 and/or the refractive index of the dielectric material of the dielectric layers 28. In an embodiment, the waveguide cores 34, 36, 38 may be comprised of silicon nitride. In an embodiment, the waveguide cores 34, 36, 38 may be comprised of aluminum nitride, silicon oxynitride, or aluminum oxide. In alternative embodiments, other materials, such as a polymer or a III-V compound semiconductor, may be used to form the waveguide cores 34, 36, 38. In an embodiment, the waveguide cores 34, 36, 38 may be comprised of the same material as the waveguide core 12. In an embodiment, the waveguide cores 34, 36, 38 may be comprised of a different material from the waveguide core 12. In an embodiment, the waveguide cores 34, 36, 38 may be formed by patterning a layer of material (e.g., silicon nitride) with lithography and etching processes.

In an embodiment, a single metallization level of the back-end-of-line stack 24 may be disposed in a vertical direction between the waveguide core 12 and the waveguide cores 34, 36, 38. In an alternative embodiment, a plurality of metallization levels of the back-end-of-line stack 24, each having a dielectric layer 26 and a patterned dielectric layer 28, may be disposed in a vertical direction between the waveguide core 12 and the waveguide cores 34, 36, 38.

Figure 5:
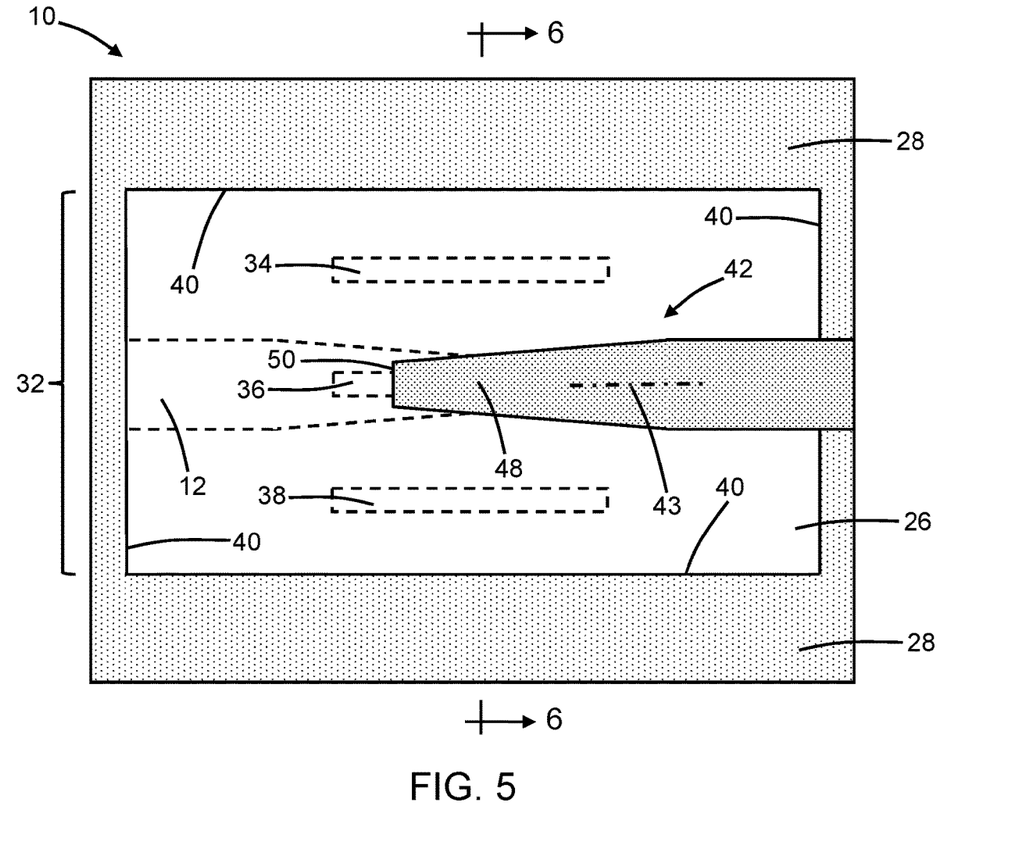
FIG. 5 is a top view of the structure at a fabrication stage of the processing method subsequent to FIG. 3.
Figure 6:
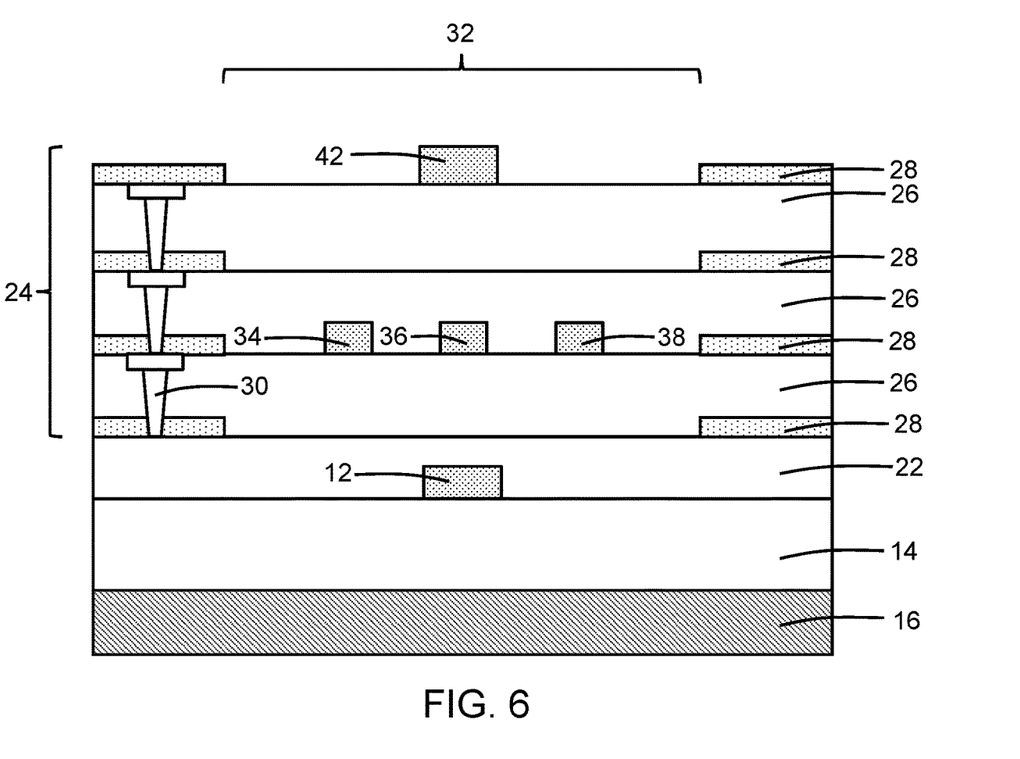
FIG. 6 is a cross-sectional view taken generally along line 6-6 in FIG. 5.

With reference to FIGS. 5, 6 in which like reference numerals refer to like features in FIGS. 3, 4 and at a subsequent fabrication stage, additional metallization levels of the back-end-of-line stack 24 may be formed after the waveguide cores 34, 36, 38 are formed. Each additional metallization layer may include a pair of the dielectric layers 26, 28 and an opening 32 formed by patterning in each dielectric layer 28. Additional metal features 30 may also be formed in the dielectric layers 26, 28, and may be connected to the metal features 30 in the lower metallization levels.

A waveguide core 42 may be formed on the uppermost dielectric layer 26 added to the back-end-of-line stack 24. The waveguide cores 34, 36, 38 are arranged in a vertical direction between the waveguide core 12 and the waveguide core 42. The waveguide core 42 may include a section 48 and an end 50 that terminates the section 48. The waveguide core 42 may be lengthwise aligned along a longitudinal axis 43. The section 48 of the waveguide core 42 may be connected to other optical components on the photonics chip. The waveguide core 42 may have a width dimension, and the width dimension may vary over the length of the section 48. In an embodiment, the section 48 may be tapered, and the width dimension of the section 48 may longitudinally increase with increasing distance from the end 50. In an embodiment, the width dimension of the section 48 may linearly increase with increasing distance from the end 50. In an alternative embodiment, the width dimension of the section 48 may change based on a non-linear function, such as a quadratic function, a cubic function, a parabolic function, a sine function, a cosine function, a Bezier function, or an exponential function. In an embodiment, the section 48 may each have a uniform taper angle as a result of the increasing width dimension. In an alternative embodiment, the section 48 may taper in multiple stages each having a different taper angle.

In an embodiment, the longitudinal axis 43 of the waveguide core 42 may be aligned parallel or substantially parallel to the longitudinal axis 13 of the waveguide core 12. In an embodiment, the longitudinal axis 43 of the waveguide core 42 may be aligned parallel or substantially parallel to the longitudinal axes 31 of the waveguide cores 34, 36, 38. The waveguide core 42 may be positioned to overlap with all or a portion of the section 18 of the waveguide core 12 and to overlap with all or a portion of the waveguide core 36. The waveguide core 42 may have a non-overlapping relationship with the waveguide core 34 and the waveguide core 38. The waveguide core 42 is disposed inside the opening 32 of the associated dielectric layer 28. The waveguide core 42 may be arranged to overlap with the openings 32 in the dielectric layers 28 of all metallization levels between the waveguide core 12 and the waveguide core 42.

The waveguide core 42 may be comprised of a dielectric material having a refractive index greater than the refractive index of silicon dioxide. The waveguide core 42 may be comprised of a dielectric material having a refractive index greater than the refractive index of the dielectric material of the dielectric layers 26 and/or the refractive index of the dielectric material of the dielectric layers 28. In an embodiment, the waveguide core 42 may be comprised of silicon nitride. In an embodiment, the waveguide core 42 may be comprised of aluminum nitride, silicon oxynitride, or aluminum oxide. In alternative embodiments, other materials, such as a polymer or a III-V compound semiconductor, may be used to form the waveguide core 42. In an embodiment, the waveguide core 42 may be comprised of the same material as the waveguide core 12. In an embodiment, the waveguide core 42 may be comprised of a different material from the waveguide core 12. In an embodiment, the waveguide core 42 may be formed by patterning a layer of material (e.g., silicon nitride) with lithography and etching processes.

In an embodiment, a single metallization level of the back-end-of-line stack 24 may be disposed in a vertical direction between the waveguide core 42 and the waveguide cores 34, 36, 38. In an alternative embodiment, multiple metallization levels of the back-end-of-line stack 24, each having a dielectric layer 26 and a patterned dielectric layer 28, may be disposed in a vertical direction between the waveguide core 42 and the waveguide cores 34, 36, 38. Additional metallization levels of the back-end-of-line stack 24 may be formed over the waveguide core 42. In an embodiment, the dielectric layers 28 of the additional metallization levels over the waveguide core 42 may lack openings 32.

In use, light may be transferred between the section 18 of the waveguide core 12 and the section 48 of the waveguide core 42 with the assistance of the features provided by the waveguide cores 34, 36, 38 in order to, for example, change an elevation or level of light propagation on the photonics chip. In an embodiment, light may be transferred upward through the back-end-of-line stack 24 from the section 18 of the waveguide core 12 to the section 48 of the waveguide core 42 with the assistance of the features provided by the waveguide cores 34, 36, 38. In an embodiment, light may be transferred downward through the back-end-of-line stack 24 from the section 48 of the waveguide core 42 to the section 18 of the waveguide core 12 with the assistance of the features provided by waveguide cores 34, 36, 38.

The waveguide cores 34, 36, 38 of the structure 10 may be effective to reduce insertion loss for the interlevel transfer of light between the waveguide core 12 and the waveguide core 42, as well to reduce crosstalk to thereby produce a flat through-band performance. In an embodiment, the waveguide core 42 may be spaced in a vertical direction above the waveguide core 12 by a distance in a range of 500 nanometers to 1.5 microns, and the waveguide cores 34, 36, 38 of the structure 10 may permit a reduction in the footprint of the interlevel escalators while promoting efficient light transfer with low loss for a spacing in this range.

Figure 7:
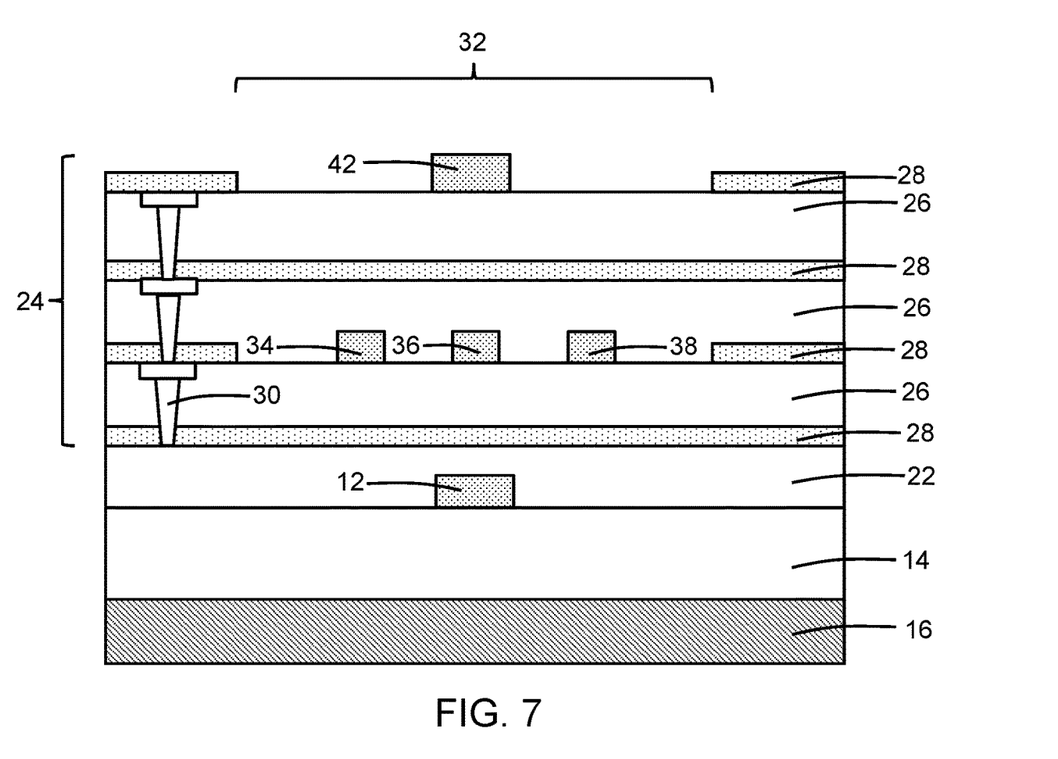
FIG. 7 is a cross-sectional view of a structure in accordance with alternative embodiments of the invention.

With reference to FIG. 7 and in accordance with alternative embodiments, the dielectric layers 28 in metallization levels of the back-end-of-line stack 24 that lack the waveguide cores 34, 36, 38 and that lack the waveguide core 42 may be intact, solid, and non-patterned. As a result, the dielectric layer 28 between the waveguide core 12 and the waveguide cores 34, 36, 38 may be intact, solid, and unpatterned, and the dielectric layer 28 between the waveguide core 42 and the waveguide cores 34, 36, 38 may be intact, solid, and unpatterned. The opening 32 in the dielectric layer 28 associated with the waveguide cores 34, 36, 38 may overlap with one or more intact dielectric layers 28 between the waveguide cores 34, 36, 38 and the waveguide core 12. The opening 32 in the dielectric layer 28 associated with the waveguide core 42 may overlap with one or more intact dielectric layers 28 between the waveguide cores 34, 36, 38 and the waveguide core 42.

Figure 8:
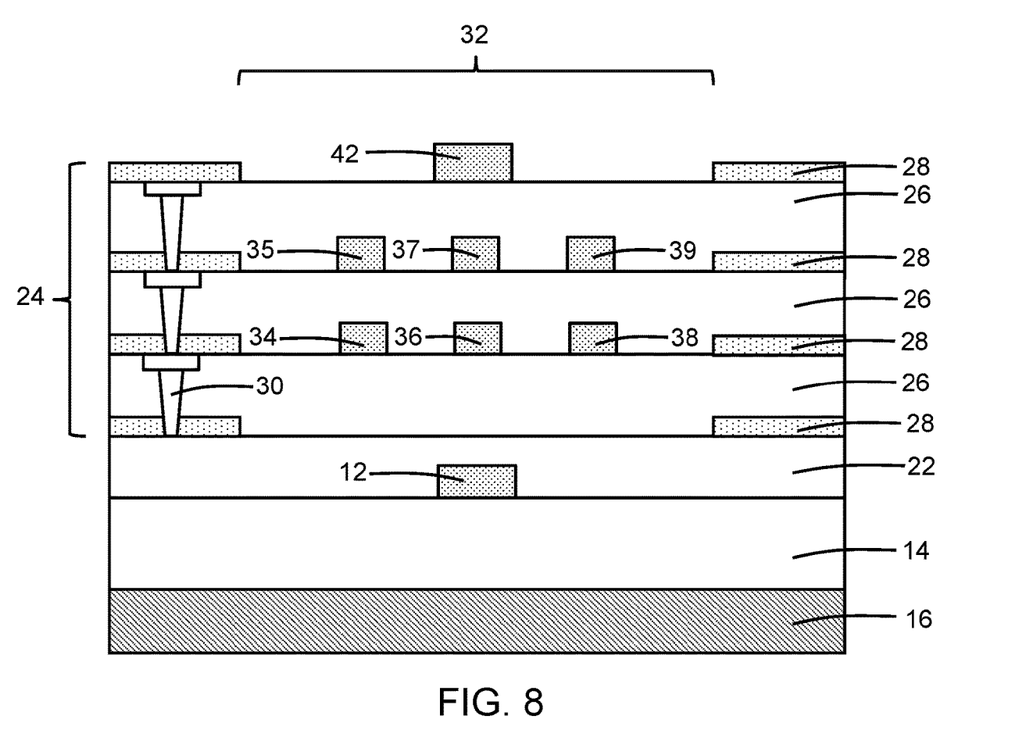
FIG. 8 is a cross-sectional view of a structure in accordance with alternative embodiments of the invention.

With reference to FIG. 8 and in accordance with alternative embodiments, the structure 10 may further include waveguide cores 35, 37, 39 that are disposed in the back-end-of-line stack 24 in a different elevation or level than the waveguide cores 34, 36, 38. The waveguide cores 35, 37, 39, which are disposed inside an opening 32 patterned in the dielectric layer 28 of the associated metallization level, may be similar or identical in construction to the waveguide cores 34, 36, 38. In that regard, the waveguide cores 35, 37, 39 may be comprised of the same material as the waveguide cores 34, 36, 38. In an embodiment, the waveguide core 35 may be positioned to overlap with the waveguide core 34, the waveguide core 37 may be positioned to overlap with the waveguide core 36, and the waveguide core 39 may be positioned to overlap with the waveguide core 38. The waveguide cores 35, 37, 39, in combination with the waveguide cores 34, 36, 38, may be effective to further improve the light transfer between the waveguide core 12 and the waveguide core 42.

Figure 9:
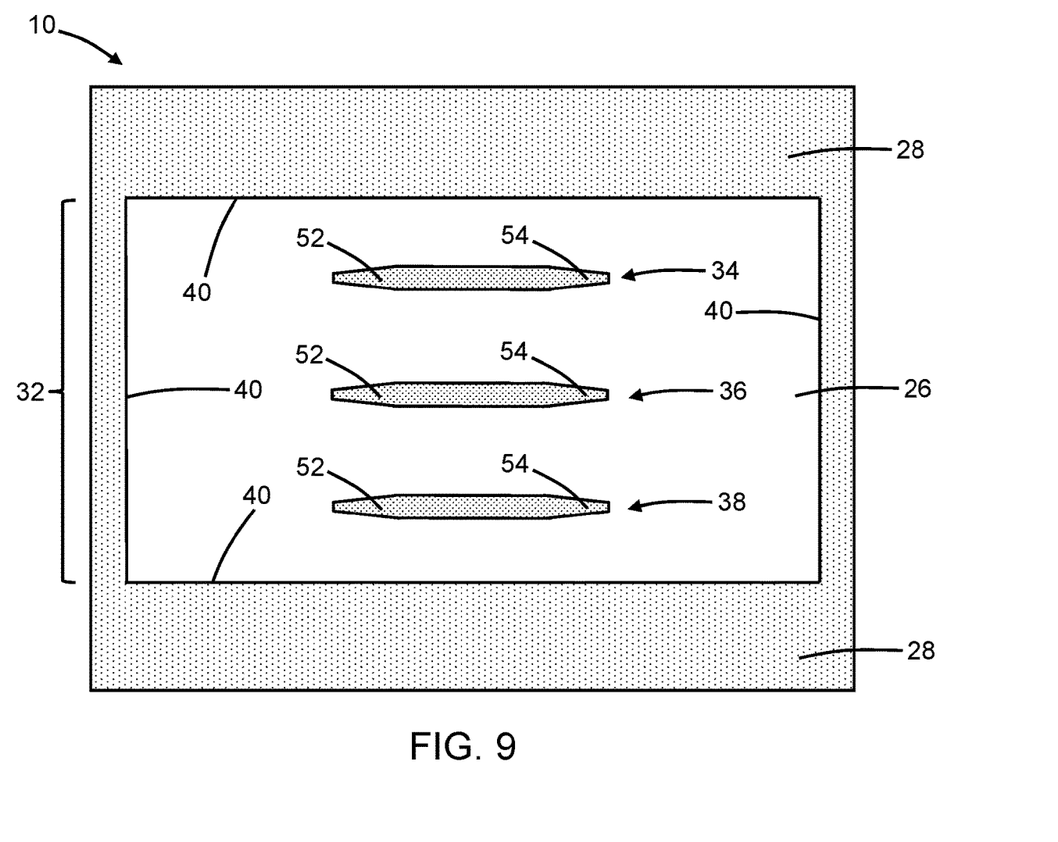
FIG. 9 is a top view of a structure in accordance with alternative embodiments of the invention.

With reference to FIG. 9 and in accordance with alternative embodiments, the waveguide cores 34, 36, 38 of the structure 10 may be configured with alternative shapes. In an embodiment, one or more of the waveguide cores 34, 36, 38 may be terminated at opposite ends by tapers 52, 54. In an embodiment, all of the waveguide cores 34, 36, 38 may be terminated at opposite ends by the tapers 52, 54.

Figure 10:
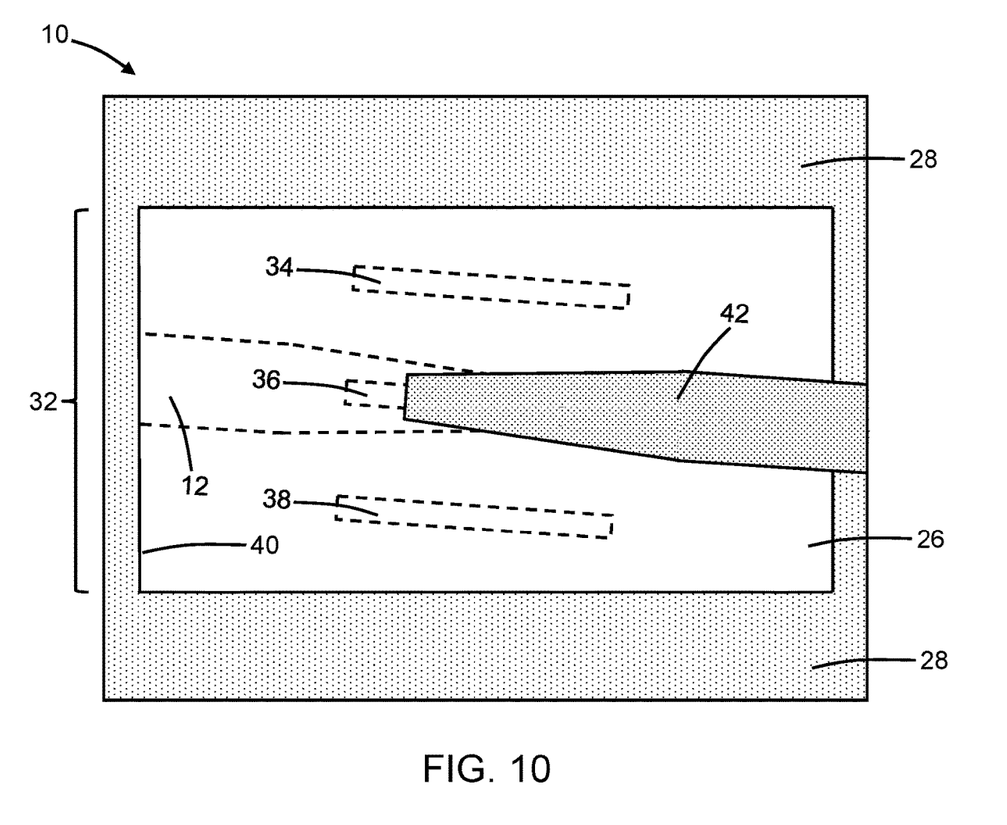
FIG. 10 is a top view of a structure in accordance with alternative embodiments of the invention.

With reference to FIG. 10 and in accordance with alternative embodiments, the waveguide core 12, waveguide cores 34, 36, 38, and waveguide core 42 of the structure 10 may be rotated or tilted at a given angle, which may reduce back reflection and provide a transition with reduced loss from back reflection.

Figure 11:
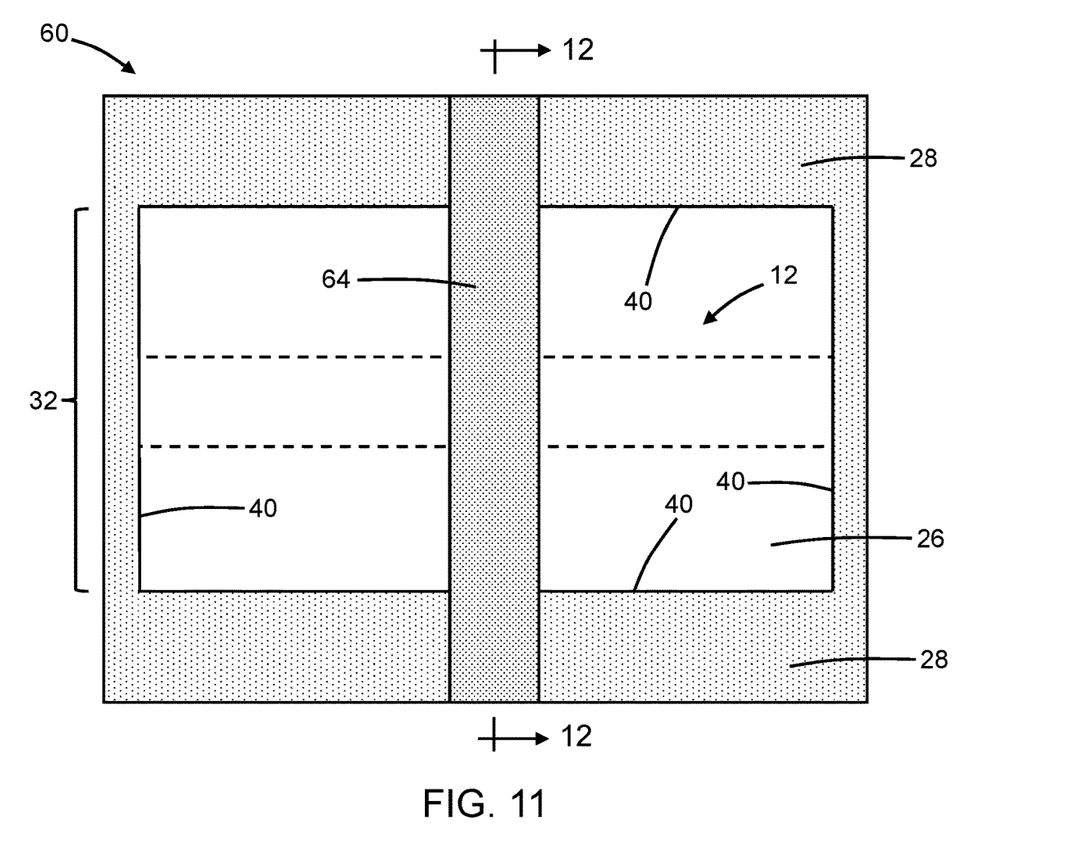
FIG. 11 is a top view of a structure in accordance with alternative embodiments of the invention.
Figure 12:
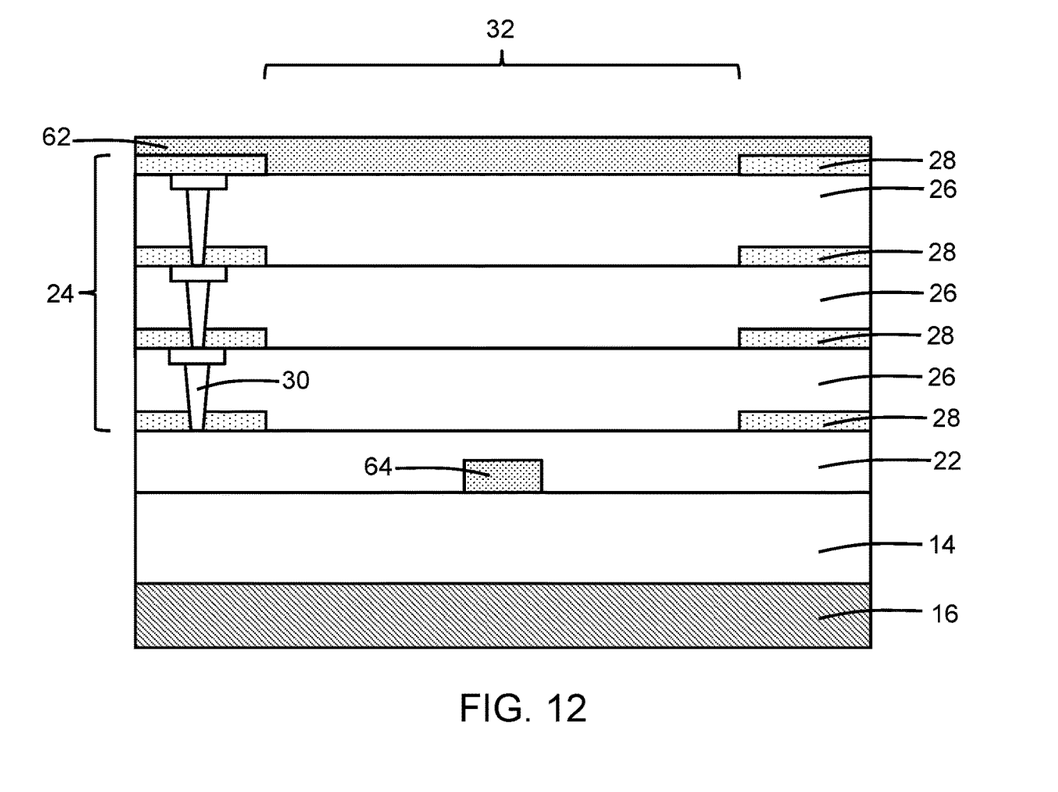
FIG. 12 is a cross-sectional view taken generally along line 12-12 in FIG. 11.

With reference to FIGS. 11, 12 and in accordance with alternative embodiments, a structure 60 for a waveguide crossing may include a waveguide core 62 and a waveguide core 64 that extends across a portion of the waveguide core 62. The waveguide core 64 may cross the waveguide core 62 inside an opening 32 in the dielectric layer 28 of the associated metallization level. The edges 40 of the opening 32 surround and frame the waveguide crossing.

Figure 13:
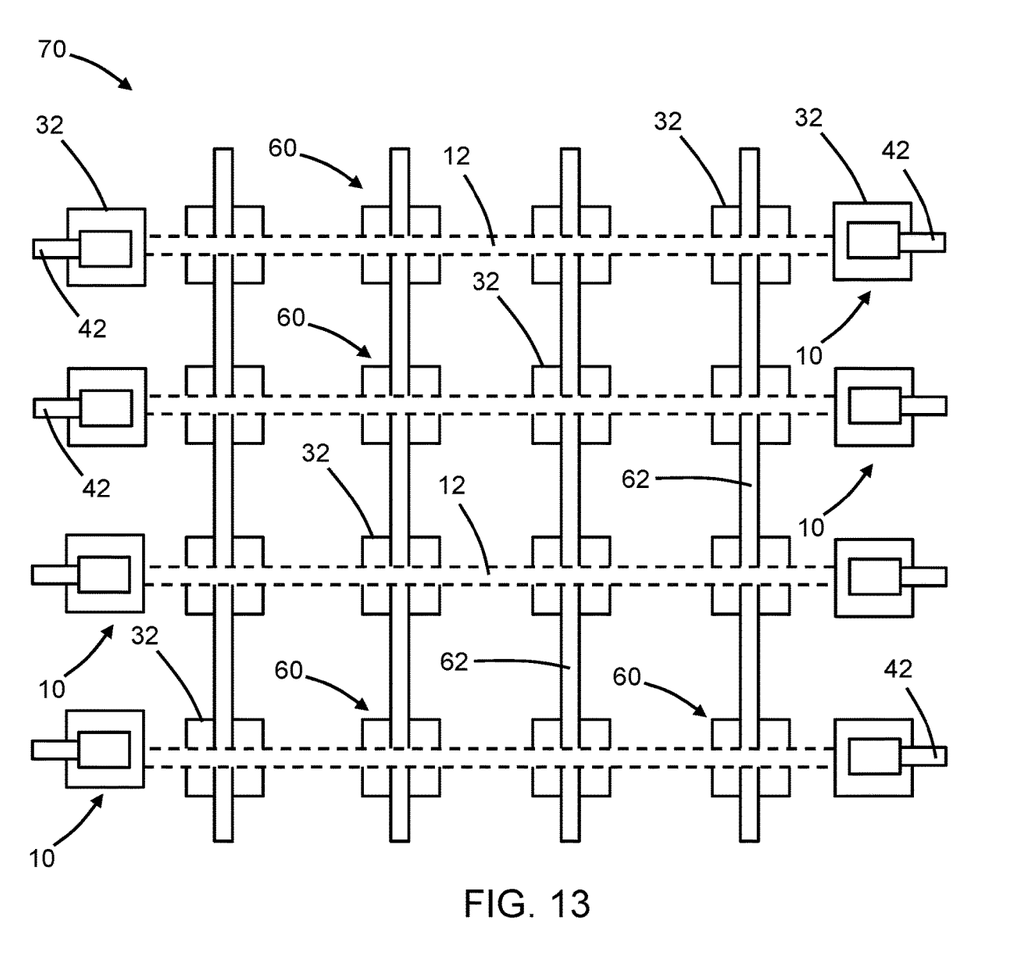
FIG. 13 is a diagrammatic top view of a structure in accordance with alternative embodiments of the invention.

With reference to FIG. 13 and in accordance with alternative embodiments, the structure 10 and the structure 60 may be replicated and integrated to form an n-by-n array 70 of substantially-identical escalators and substantially-identical waveguide crossings that are deployed in a photonics circuit. Instances of the structure 10 may transfer the light from the waveguide cores 42 downward to respective waveguide cores 12 at one side edge of the array 70, and instances of the structure 10 may transfer the light from the waveguide cores 12 upward back to the waveguide cores 42 at an opposite side edge of the array 70. Each instance of the structure 10 includes an opening 32 in the dielectric layer 28 of the metallization level associated with the waveguide cores 34, 36, 38. Each instance of the structure 10 includes an opening 32 in the dielectric layer 28 of the metallization level associated with the waveguide core 42. Waveguide cores 62 may be arranged to cross over the waveguide cores 12 at multiple waveguide crossings inside respective openings 32 in one of the dielectric layers 28. Each instance of the structure 60 includes an opening 32 in the dielectric layer 28 of the metallization level associated with the waveguide crossing that includes one of the waveguide cores 12 and one of the waveguide cores 62. The metallization level including the waveguide cores 62 may be disposed between the metallization level including the waveguide cores 12 and the metallization level including the waveguide cores 42. In an embodiment, the waveguide cores 62 of the structures 60 may be disposed in the same metallization level as the waveguide cores 34, 36, 38 of the structures 10.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first waveguide core including a section; and
   a back-end-of-line stack including a first dielectric layer, a second dielectric layer on the first dielectric layer, an opening in the second dielectric layer, a second waveguide core including a section that overlaps with the section of the first waveguide core, and a plurality of third waveguide cores arranged in a vertical direction between the first waveguide core and the second waveguide core, the plurality of third waveguide cores positioned inside the opening in the second dielectric layer, the first dielectric layer comprising a first material with a first refractive index, and the second dielectric layer comprising a second material with a second refractive index different from the first refractive index.

2. The structure of claim 1 wherein the second refractive index is greater than the first refractive index.

3. The structure of claim 1 wherein the back-end-of-line stack includes a third dielectric layer comprising the second material and an opening in the third dielectric layer, and the opening in the third dielectric layer is disposed in the vertical direction between the plurality of third waveguide cores and the first waveguide core.

4. The structure of claim 1 wherein the back-end-of-line stack includes a third dielectric layer comprising the second material, and the third dielectric layer is disposed in the vertical direction between the opening in the second dielectric layer and the first waveguide core.

5. The structure of claim 1 wherein the back-end-of-line stack includes a third dielectric layer comprising the second material and an opening in the third dielectric layer, and the opening in the third dielectric layer is disposed in the vertical direction between the plurality of third waveguide cores and the second waveguide core.

6. The structure of claim 1 wherein the back-end-of-line stack includes a third dielectric layer comprising the second material, and the third dielectric layer is disposed in the vertical direction between the opening in the second dielectric layer and the second waveguide core.

7. The structure of claim 1 wherein the opening in the second dielectric layer has a plurality of edges defining a perimeter, and the plurality of third waveguide cores are fully disposed inside the perimeter of the opening in the second dielectric layer.

8. The structure of claim 1 wherein the back-end-of-line stack includes a third dielectric layer comprising the second material, an opening in the third dielectric layer, and a third waveguide core including a portion that extends at an angle across a portion of the first waveguide core, and the portion of the third waveguide core is disposed inside the opening in the third dielectric layer.

9. The structure of claim 1 wherein the section of the first waveguide core terminates at an end, and the section of the first waveguide core has a width dimension that increases with increasing distance from the end of the section.

10. The structure of claim 1 wherein the section of the second waveguide core terminates at an end, and the section of the second waveguide core has a width dimension that increases with increasing distance from the end of the section.

11. The structure of claim 1 wherein the second material is nitrogen doped silicon carbide or nitrogen doped hydrogenated silicon carbide.

12. The structure of claim 11 wherein the first material is tetraethylorthosilicate silicon dioxide, fluorinated-tetraethylorthosilicate silicon dioxide, or silicon dioxide.

13. The structure of claim 12 wherein the plurality of third waveguide cores comprise silicon nitride.

14. The structure of claim 1 wherein each of the plurality of third waveguide cores includes a taper.

15. The structure of claim 1 wherein the first waveguide core, the second waveguide core, and the plurality of third waveguide cores are tilted.

16. The structure of claim 1 wherein the plurality of third waveguide cores have a laterally spaced arrangement, and at least one of the plurality of third waveguide cores overlaps with the section of the first waveguide core.

17. The structure of claim 16 wherein the section of the second waveguide core overlaps with at least one of the plurality of third waveguide cores.

18. The structure of claim 1 wherein the first waveguide core, the second waveguide core, and the plurality of third waveguide cores comprise silicon nitride.

19. The structure of claim 18 wherein the second waveguide core is spaced in the vertical direction above the first waveguide core by a distance in a range of 500 nanometers to 1.5 microns.

20. A method comprising:
    forming a back-end-of-line stack including a first dielectric layer, a second dielectric layer on the first dielectric layer, an opening in the second dielectric layer, a second waveguide core including a section that overlaps with a section of a first waveguide core, and a plurality of third waveguide cores arranged in a vertical direction between the first waveguide core and the second waveguide core,
    wherein the plurality of third waveguide cores are positioned inside the opening in the second dielectric layer, the first dielectric layer comprises a first material with a first refractive index, and the second dielectric layer comprises a second material with a second refractive index different from the first refractive index.

* * * * *